Dec. 12, 1939.  M. A. NYE ET AL  2,182,902
DRAW BENCH
Filed Aug. 30, 1938  3 Sheets-Sheet 1
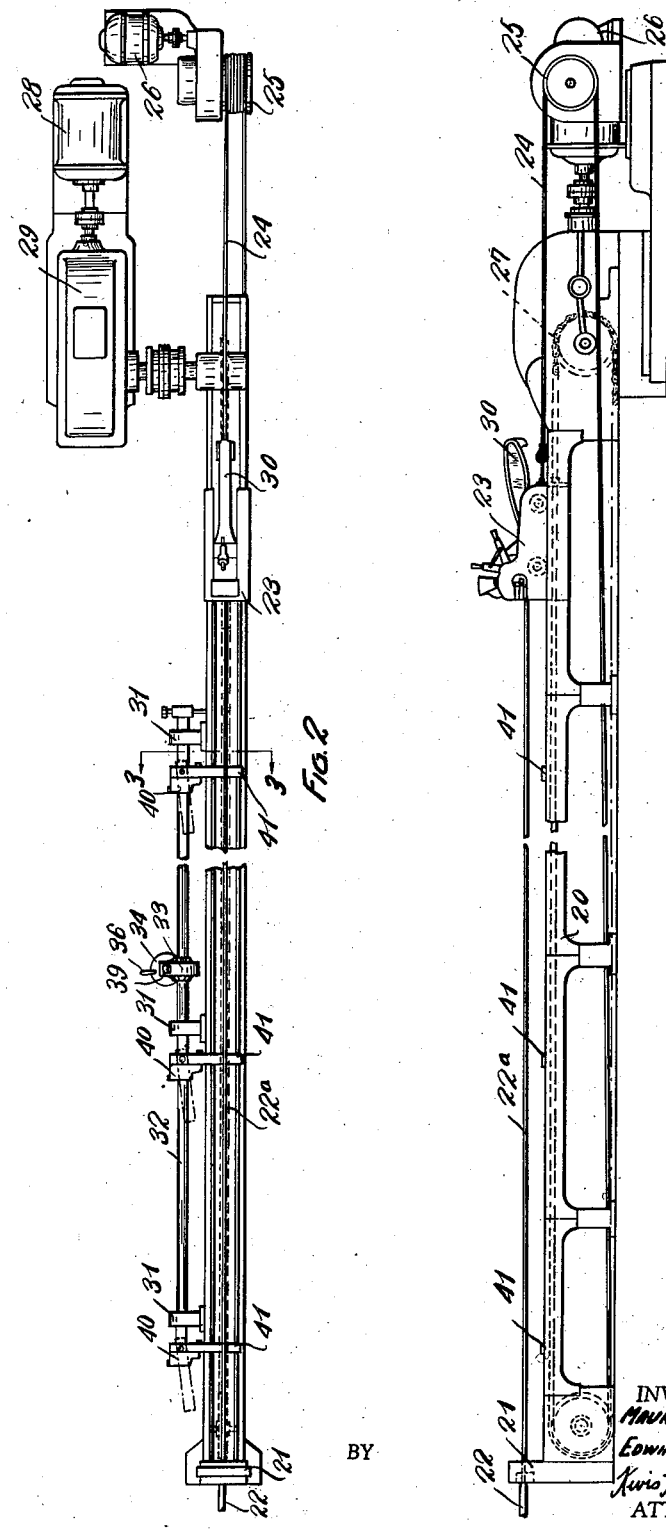
INVENTORS
MAURICE A. NYE
EDWIN J. McILVRIED
BY Kurio Hudson Kent
ATTORNEYS

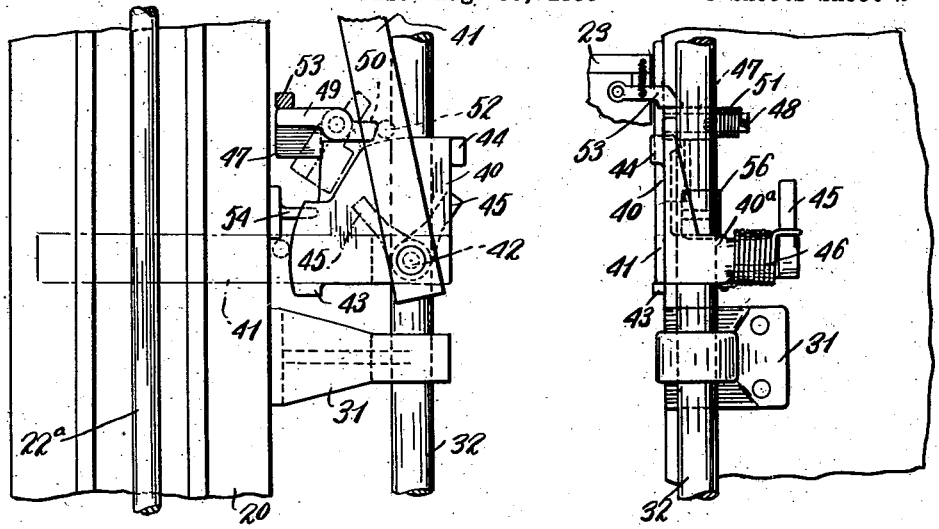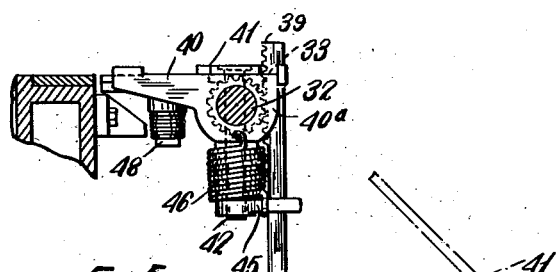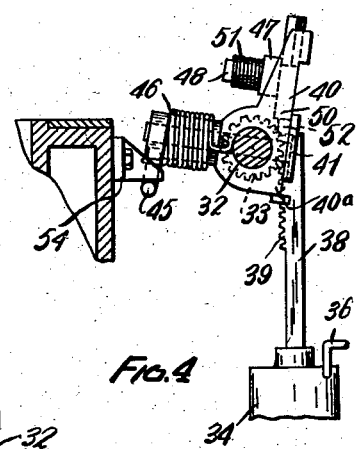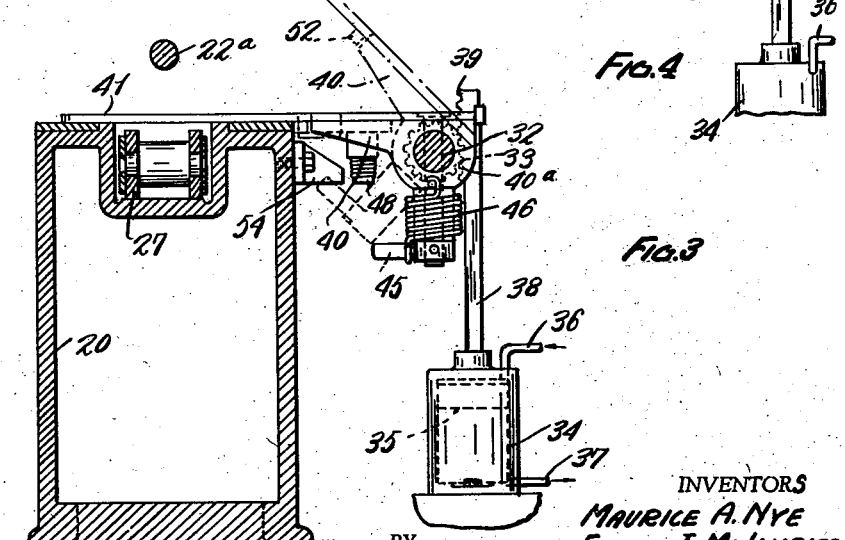

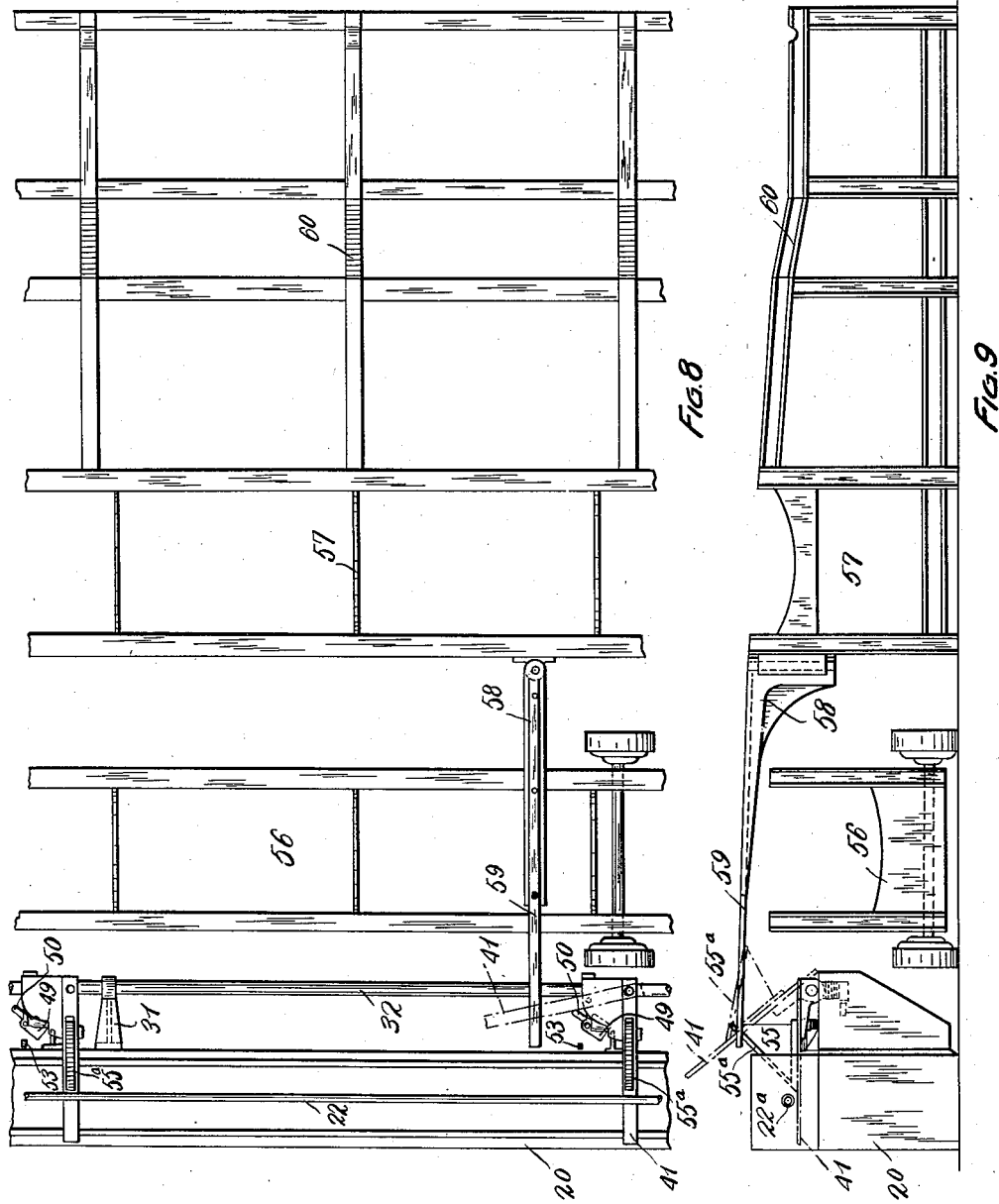

Patented Dec. 12, 1939

2,182,902

UNITED STATES PATENT OFFICE 2,182,902

DRAW BENCH

Maurice A. Nye, Cuyahoga Falls, and Edwin J. McIlvried, Stow Corners, Ohio, assignors to The Vaughn Machinery Company, Cuyahoga Falls, Ohio, a corporation of Ohio Application August 30, 1938, Serial No. 227,486

15 Claims. (Cl. 205—3)

This invention relates to a draw bench such as is employed in the drawing of metal rods or wires.

More particularly the invention relates to unloading mechanism associated with a draw bench for removing from the bench the rods or wires which have been drawn through the dies and depositing the same in a suitable bin, or in a transfer truck, or upon a transfer arm, or in some other desirable place.

An object of the invention is to provide in connection with a draw bench novel and improved unloading mechanism for removing the rods or wires from the bench after they have been drawn.

A further object is to provide in connection with a draw bench improved unloading mechanism for removing the drawn rods or wires from the bench and which mechanism while relatively simple in construction functions efficiently in attaining the purpose for which it was designed.

A still further object is to provide in connection with a draw bench improved unloading mechanism for removing the drawn rods or wires therefrom and which mechanism is so constructed that it will raise the drawn rods or wires to a position wherein they can roll readily and rapidly into a storage bin or into a transfer truck or upon a transfer arm or into or upon some suitable transfer or storage member.

An additional object is to provide an improved unloading mechanism for a draw bench and which is so constructed that it will not interfere with the movements of the drawing carriage along the bench.

A still further object is to provide in connection with a draw bench having unloading mechanism associated therewith for removing the drawn rods or wires, improved means for automatically and successively moving the rod or wire lifting or unloading elements of said mechanism from an inoperative position at one side of the bench into an operative position beneath the rod or wire being drawn as the drawing carriage moves along the bench away from the drawing dies and which means is controlled by the movement of the carriage.

Further and additional objects and advantages not hereinbefore referred to will become apparent hereinafter during the detailed description of the invention which is to follow.

Embodiments of the invention are illustrated in the accompanying drawings wherein, Fig. 1 is a side elevational view of a draw bench to which has been applied the unloading mechanism of the present invention.

Fig. 2 is a top plan view of the draw bench shown in Fig. 1.

Fig. 3 is a transverse sectional view through the draw bench, on a larger scale than Figs. 1 and 2, and is taken substantially on line 3—3 of Fig. 2 looking in the direction of the arrows, the unloading arm of the unloading mechanism being shown in the operative position beneath the rod being drawn in full lines, and in unloading or raised position by dot and dash lines.

Fig. 4 is a detached fragmentary sectional view similar to Fig. 3 but illustrates the position taken by the parts of the unloading mechanism after the unloading arm has reached and passed unloading position and has swung relative to its bracket plate toward a horizontal position and in a direction substantially longitudinally of the draw bench.

Fig. 5 is a view similar to Fig. 4 but shows the position of the parts of the unloading mechanism when the bracket plate supporting the unloading arm has returned to the horizontal position shown in Fig. 3, while the unloading arm remains in a position laterally of the draw bench and out of the way of the drawing carriage as it moves along the bench.

Fig. 6 is a top plan view of a portion of the draw bench and shows in full lines the position of the unloading arm indicated in Fig. 5, at which time the arm is held against movement relative to the bracket plate by a latch means while the dot and dash lines indicate the position of the unloading arm after the draw bench carriage has passed by in a rod or wire drawing direction and the latch means holding the unloading arm against movement has been tripped and the arm allowed to swing in a horizontal plane inwardly beneath the rod which is being drawn.

Fig. 7 is a side elevational view of a portion of the draw bench and of the unloading mechanism and is taken looking from the right hand side of Fig. 6.

Fig. 8 is a top plan view of a portion of a draw bench and illustrates a somewhat modified form of unloading mechanism from that shown in Figs. 1 to 7 inclusive, and Fig. 9 is an end elevational view of the modified draw bench and unloading mechanism shown in Fig. 8 and is taken looking from the bottom of said Fig. 8.

Draw benches of the type illustrated herein are well known in the art and usually comprise an elongated bed along which travels a drawing carriage provided with means for gripping the end of the rod or wire extending through the drawing dies located at one end of the bench and said carriage acts as it moves toward the end of the bench away from the dies to draw the gripped rod or wire through the dies to cause it to assume the desired diameter.

In the accompanying drawings a draw bench of this character is illustrated and comprises an elongated bench proper or bed 20 of any suitable and well known construction. At one end of the bench or bed 20 are located the drawing dies. The rod or wire 22 to be drawn is positioned in the dies 21 and has its end secured in suitable gripping jaws arranged in the movable carriage 23 that travels longitudinally along the bed 20. It will be understood that the rods or wires 22 prior to being drawn can be supported upon a suitable loading table adjacent to the dies but not shown herein. The carriage 23 has secured to it a cable 24 which passes around a drum 25 driven by any suitable means such as an electric motor 26 through a suitable driving connection as is well understood in the art. The cable 24 has one of its ends connected to the right hand end of the carriage 23 as viewed in the drawings, and extends around the drum 25 and thence lengthwise of the bed 20 toward the dies 21 where it passes around a suitable sheave or pulley and from which it extends in the opposite direction through or beneath the carriage 23 and has its opposite end connected to the right hand end of the carriage likewise, as clearly indicated in Fig. 1. Arranged centrally in the bed 20 is an endless chain 27, see Figs. 1, 2 and 3, passing around suitable sprockets located at opposite ends of the bed, with the right hand sprocket, as shown in the drawing, driven from a suitable source of power such as the electric motor 28, acting through a gear reduction indicated generally at 29.

In operating the draw bench the carriage 23 is moved along the bed toward the dies 21 by the cable 24 when the drum 25 is rotated in one direction by the motor 26. When the carriage 23 is in the proper position adjacent the dies 21 the end of the rod 22 which has been positioned in the dies is engaged by the gripping jaws carried by the carriage, and then the operator reverses the rotation of the drum 25 and also causes the hooked arm 30 mounted on the carriage to engage with the chain 27 which has its upper length traveling from left to right, as viewed in the drawings. The carriage 23 is then moved along the bed away from the dies 21 by the cable 24 and by the chain 27 into which the arm 30 has hooked. This movement of the carriage pulls the rod through the dies so as to produce upon the drawn portion 22a of the rod the desired diameter. When the carriage 23 has traveled the desired length for the drawing operation, the drawn portion 22a of the rod is released from the dies 21, whereupon the tension which the rod has been exerting on the carriage 23 is released and the hooked arm 30 is disengaged, either automatically or manually, by the operator from the chain 27, at which time the operation of the drum 25 is discontinued through suitable control means.

The draw bench as thus far described is conventional and well known in the art and forms per se no part of the present invention, and consequently need not be illustrated or described in greater detail.

When the drawn portion 22a of the rod has been released from the dies 21 and from the jaws of the carriage 23, it falls down upon the bed 20 and suitable means should be provided for unloading or removing said drawn portion from the bed of the draw bench and depositing the same in a transfer bin or upon a transfer arm or in or upon some other suitable bin or table as the case may be.

As previously stated, the present invention relates to an improved mechanism for unloading the drawn portions of the rod or wire from the draw bench after each drawing operation. It is essential that the unloading mechanism be so constructed as not to interfere with the movements of the carriage along the bed.

The bed 20 of the draw bench is provided at longitudinally spaced intervals on one of its sides with bearing brackets 31 and in which is rotatably or rockably mounted a shaft 32. The shaft 32 at any suitable place, but preferably in the position indicated in Fig. 2, is provided with a pinion 33 which, in this instance, is shown as fixed thereto, but, as will be readily understood, could be made integral with the shaft if desired.

A hydraulic motor is located adjacent the bed 20 and comprises the cylinder 34 in which is the movable piston 35, see Figs. 2, 3 and 4. The opposite ends of the cylinder 34 are connected by means of suitable conduits 36 and 37 with a source of supply, not shown, of pressure fluid.

The piston 35 is provided with a piston rod 38 which extends upwardly beyond the upper end of the cylinder 34 and is provided at its upper end with a rack portion 39 that meshes with the pinion 33 on the shaft 32, wherefore it will be seen that when the piston 35 moves in one direction in the cylinder 34 the shaft 32 will be rocked or rotated in one direction, while when the piston moves in the opposite direction the shaft or rod 32 will also be rocked or rotated in a reverse direction.

A plurality of bracket plates 40 are operatively associated with the shaft 32 at longitudinally spaced intervals by means of downwardly extending boss portions 40a arranged on the underside of the bracket plates 40 and provided with openings through which the shaft 32 extends, the shaft 32 and the portions 40a of the bracket plates being connected by suitable means to move together when the shaft is rocked.

An unloading arm 41 is associated with the upper side of each bracket plate 40, said arm having one of its ends pivotally connected with respect to the bracket plate and the shaft 32 by means of a pin 42 fixed thereto and extending vertically through the bracket plate 40, portion 40a thereof and the shaft 32, when said parts are in the position shown in Figs. 3, 5 and 6.

It will be seen that the unloading arm 41 can swing over the upper surface of the bracket plate 40 between the stop lugs 43 and 44 carried by the bracket plate when the pin 42 is rocked in one or the other direction. The pin 42 extends below the lower end of the portion 40a of the bracket plate and has fixed thereto a finger 45. A coil or rat trap spring 46 is arranged on the portion 40a of the bracket plate and has one of its ends connected to the portion 40a, while its opposite end bears against the finger 45, wherefore it will be seen that turning movement of the finger 45 and pin 42 in one direction relative to the bracket plate acts to tension said spring, after which said spring will serve to turn the finger 45 and pin 42 in the opposite direction to its original position.

The bracket plate 40 is provided with a bearing boss 47 in which is rockably mounted the short pin portion 48 of a latch member having a pair of arms indicated at 49 and 50. A coil spring 51 is arranged on the pin portion 48 below the boss 47 and acts to normally maintain the latch arms 49 and 50 in the position indicated in full lines in Fig. 6, that is, when the latch has been moved to the dash line position of Fig. 6 said spring 51 will return the latch to its original and full line position as will be readily understood. The latch arm 50 is beveled on its free end and is adapted to cooperate with a pin 52 carried by the underside of the unloading arm 41 for a purpose later to become apparent, while the latch arm 49 is adapted to cooperate with a pivoted dog 53 carried by the carriage 23 of the draw bench and depending downwardly therefrom for a purpose later to be explained.

When the carriage 23 has reached the end of its drawing movement all of the unloading arms 41 will be in the position indicated by full lines in Figs. 1, 2 and 3, at which time said arms will extend transversely across the bed of the draw bench beneath the drawn portion 22a of the rod and will be in contact with the stop lugs 43 of their respective bracket plates 40. When the drawn portion 22a of the rod is released and it is desired to unload said portion from the draw bench the operator, by means of a suitable control valve not shown, causes fluid pressure to flow into the cylinder 34 through the conduit 36 and above the piston 35 which is in the position indicated in Fig. 3. A downward movement of the piston 35 then occurs with a resultant clockwise movement of the shaft 32, since the rack portion 39 of the piston rod 38 is intermeshed with the pinion 33 on the shaft 32. This clockwise movement of the shaft 32 causes an upward tilting movement of the bracket plates 40 which, as has been explained, are fixed to the shaft. Of course the upward movement of the bracket plates 40 results in an upward swinging movement of the unloading arms 41 and when said arms have reached a sufficiently inclined position the drawn portion 22a of the rod will roll downwardly along the arms and be discharged therefrom into a suitable transfer bin or upon a suitable transfer table or arm, as the case may be.

The upward movement of the bracket plates 40 during the clockwise movement of the shaft 32 brings the fingers 45 secured to the lower ends of the pins 42 into engagement (as indicated in dash lines in Fig. 3) with the sides of the laterally extending arms 54 of fulcrum members secured on the side of the bed 20. The fingers 45 come into contact with the arms 54 before the piston 35 has reached the limit of its downward movement, wherefore the bracket plates 40 continue to be rocked upwardly along with the clockwise movement of the shaft 32 even after the unloading arms 41 have reached unloading position. During this continued upward movement of the bracket plates 40 the fingers 45 will turn about the arms 54 as a fulcrum with a resultant turning movement of the pins 42 relative to the shaft 32 and bracket plates 40, and such movement of the pins 42 will swing the unloading arms 41 with the pins 42 as an axis and relative to the bracket plates 40 until said arms 41 have moved from the dash line position of Fig. 3 to the full line position of Fig. 4, at which time said unloading arms 41 will extend substantially horizontally but will lie edgewise with respect to a horizontal plane and laterally of the bed 20. When the arms are in this latter position the pins 52 on their undersides will be in contact with the latch arms 50 of the latches carried by the bracket plates 40, and consequently the unloading arms 41, pins 42 and fingers 45 are held by the latches against swinging or turning movement relative to the bracket plates 40.

It will be understood that during the movement of the parts from the dash line position of Fig. 3 to the position shown in Fig. 4, the fingers 45 turning about the arms 54 as fulcrums have effected a winding up or tensioning of the springs 46.

When the parts have attained the position shown in Fig. 4 the flow of pressure fluid to the cylinder 34 is reversed, either automatically or under the manual control of the operator as may be desired, whereupon the shaft 32 and the bracket plates 40 are rocked in an anticlockwise direction from the position shown in Fig. 4 to the position shown in Fig. 5, at which latter time the bracket plates 40 are back in the original horizontal position shown in Fig. 3 in full lines. During this anticlockwise movement of the bracket plates 40 the fingers 45 cannot turn, since the unloading arms 41 are held against turning movement by the latch arms 50 in engagement with the pins 52, and consequently said fingers 45 merely slide along the arms 54; with the result that the spring 46 remains in tension. When the bracket plates 40 have been returned to the horizontal position after the unloading operation, as just described, the unloading arms 41 have moved with the bracket plates 40 from the on edge position of Fig. 4, so that they lie in a substantially horizontal plane, but lie laterally of the bed 20 of the draw bench, as indicated by full lines in Fig. 6, at which time the unloading arms 41 will not interfere with the movement of the carriage 23 along the bed of the draw bench.

The operator now causes the carriage 23 to be moved by the cable 24 along the bench to adjacent the dies 21 and to be secured to the rod 22 projecting through the dies. When the jaws of the carriage have gripped the rod the drawing movement of the carriage is initiated. As the carriage moves along the bed of the draw bench in its drawing movement the dog 53 carried by the carriage will successively strike the arms 49 of the latches carried by the bracket plates 40 and rock the latches against the action of the springs 51 from the full line position of Fig. 6 to the dash line position thereof. As soon as the latch arms 50 are disengaged from the pins 52 carried by the unloading arms 41, the tensioned coil springs 46 are free to act to cause an anticlockwise rotation of the pins 42, fingers 45, and unloading arms 41, which latter move over the bracket plates 40 in a horizontal plane and beneath the drawn portion 22a of the rod until the arms contact with the lugs 43 carried by the bracket plates 40.

It will be understood that when the carriage 23 is moving toward the dies 21 the dog 53 is free to ride over the latch arms 49, wherefore the latch arms 50 will not be tripped out of engagement with the pins 52 carried by the unloading arms 41.

From the foregoing it will have been seen that the mechanism embodying the present invention is such that the unloading arms will always be tilted to a sufficient angle to insure complete unloading or discharge of the drawn rods.

It will also have been noted that relatively simple yet efficient means is provided not only for raising the unloading arms, but also for positioning the arms such that the carriage can travel along the bed toward the dies and also in a drawing direction without interference, while during the latter movement of the carriage the arms are successively and automatically moved into operative position beneath the rod as the carriage passes along the bed and this movement of the arms occurs when the latch mechanisms are released by the carriage to permit the springs 46 which have been tensioned during the unloading movement of the arms to cause the latter to swing into operative position.

In Figs. 8 and 9 there is disclosed a somewhat different form of unloading mechanism than the form which has been previously described. In some plants cranes may not be available for removing the drawn rods which have been unloaded from the draw bench, and in such circumstances it is necessary to employ trucks to move the drawn rods away from the draw bench. Also in some installations it is desirable to provide means for transferring the drawn rods which have been unloaded from the draw bench directly to a table or rack or similar member located adjacent to the bench. The construction shown in Figs. 8 and 9 is admiriably adapted for both of these purposes.

The construction illustrated in Figs. 8 and 9 includes a draw bench which is identical with the bench previously described and is, therefore, indicated generally at 20. Likewise, the unloading mechanism corresponds to the unloading mechanism previously described with one exception, and insofar as the parts are identical with the parts of the previously described mechanism the same reference characters are employed and it will not be necessary to again describe the mechanism in detail.

The unloading arms 41 have secured to their upper sides and intermediate their ends angle brackets 55 which are located, when the arms are beneath the drawn portion 22a of the rod, so as to lie to one side of the rod. It will be seen that when the unloading arms 41 are raised to unloading position the upper inclined surfaces 55a of the angle brackets 55 extend outwardly and downwardly laterally of the unloading arms 41 and terminate above a wheeled truck 56 positioned adjacent the unloading side of the draw bench. It will be apparent that the drawn portion 22a of the rod will be lifted by the unloading arms 41 and will then roll down the surfaces 55a of the angle brackets and into the truck 56.

As already stated it is sometimes required to transfer the drawn rod directly from the draw bench to another table or bin as, for example, to a bin 57 where the drawn rods may be pointed. In such a case the bin 57 on the side thereof adjacent the draw bench may be provided with a plurality of longitudinally spaced pivotally mounted brackets 58 so shaped and mounted as to be inclined upwardly toward the draw bench. These brackets 58 have secured thereto arms 59 which extend to a point closely adjacent the draw bench. It will be seen that when the unloading arms 41 are raised to unload the drawn rod the latter will roll down the surface 55a of the angle brackets 55 and upon the arms 59 and down the latter into the bin 57. Of course when it is merely desired to unload the rods into the truck 56 the brackets 58 are swung about their pivotal connections to the bin 57, so as to lie closely adjacent said bin and out of the way of the operators handling the truck 56.

It may be desirable to transfer the drawn rods to a point farther removed from the draw bench than the bin 57. In such case a cover could be placed over the bin 57 and arranged at a suitable incline, wherefore the unloaded rods will roll down the arms 59, across the cover, and down the extended structure indicated generally at 60 to the point desired.

Although specific embodiments of the invention have been illustrated and described herein it will be understood that the invention is susceptible of various modifications and adaptations within the scope of the appended claims.

Having thus described our invention we claim:

1. In a draw bench of the character described, an unloading mechanism comprising unloading arms, and means for swinging said arms in substantially vertical planes from a work-receiving position wherein they extend substantially transversely and horizontally across the bench to an inclined or tilted work-discharging position.

2. In a draw bench of the character described, an unloading mechanism comprising unloading arms, and means for swinging said arms from a position wherein they extend substantially transversely and horizontally across the bench to an inclined or tilted position and then to a substantially horizontal position located laterally of a side of the bench.

3. In a draw bench of the character described, an unloading mechanism comprising unloading arms, means for swinging said arms from a position wherein they extend substantially transversely and horizontally across the bench to an inclined or tilted position and then to a substantially horizontal position located laterally of a side of the bench, and means for moving said arms in a substantially horizontal plane from said last named position to said first named position.

4. In a draw bench of the character described, an unloading mechanism comprising unloading arms, and means for simultaneously swinging said arms from a position wherein they extend substantially transversely and horizontally across the bench to an inclined or tilted position and then simultaneously to a substantially horizontal position located laterally of a side of the bench.

5. In a draw bench of the character described, an unloading mechanism comprising unloading arms, means for simultaneously swinging said arms from a position wherein they extend substantially transversely and horizontally across the bench to an inclined or tilted position and then simultaneously to a substantially horizontal position located laterally of a side of the bench, and means for successively moving said arms in a substantially horizontal plane from said last named position to said first named position.

6. In a draw bench of the character described, an unloading mechanism comprising unloading arms, means for simultaneously swinging said arms from a position wherein they extend substantially transversely and horizontally across the bench to an inclined or tilted position and then to a substantially horizontal position located laterally of a side of the bench, spring means associated with said first named means and placed under tension during the movement of said arms to said last named position, stop means for holding said arms in said last named position, and means carried by the carriage of the draw bench for successively tripping said stop means during the drawing movement of the carriage to permit said tensioned spring means to move said arms out of said last named position.

7. In a draw bench of the character described, an unloading mechanism comprising a shaft located laterally of the bench adjacent the plane of the top thereof and extending longitudinally of the bench, a plurality of longitudinally spaced unloading arms operatively connected to said shaft and extending substantially transversely and horizontally across the bench, and means for rocking said shaft to simultaneously move said arms to an inclined or tilted position.

8. In a draw bench of the character described, an unloading mechanism comprising a rockable shaft located laterally of said bench and extending longitudinally thereof, a plurality of unloading arms operatively associated with said shaft at longitudinally spaced intervals for movement therewith and for swinging movement independently thereof, means for rocking said shaft to simultaneously move said arms from a position wherein they extend substantially transversely and horizontally across the bench to an inclined or tilted position, and means associated with said bench, shaft and arms such that the continued rocking movement of said shaft after said arms have reached said last named position causes said arms to swing independently of said shaft during the continued rocking movement thereof to a substantially horizontal position located laterally of a side of the bench.

9. In a draw bench of the character described, an unloading mechanism comprising a rockable shaft located laterally of the bench and extending longitudinally thereof, unloading arms operatively associated with said shaft by means of rotatable pins fixed to said arms and carried by said shaft and extending transversely of the axis of the shaft, means for rocking said shaft to simultaneously raise said arms from a position wherein they extend substantially transversely and horizontally across the bench to an inclined or tilted position, and means for turning said pins about their axes upon the continued rocking movement of said shaft in the same direction to cause said arms to move from said inclined or tilted position to an edgewise but substantially horizontal position located laterally of a side of the bench.

10. In a draw bench of the character described, an unloading mechanism comprising a rockable shaft located laterally of the bench and extending longitudinally thereof, unloading arms operatively associated with said shaft by means of rotatable pins fixed to said arms and carried by said shaft and extending transversely of the axis of the shaft, means for rocking said shaft to simultaneously raise said arms from a position wherein they extend substantially transversely and horizontally across the bench to an inclined or tilted position, means for turning said pins about their axes upon the continued rocking movement of said shaft in the same direction to cause said arms to move from said inclined or tilted position to an edgewise but substantially horizontal position located laterally of a side of the bench, spring means associated with said last named means and placed under tension during said turning of said pins, and means for restraining said pins from turning in the reverse direction under the action of said spring.

11. In a draw bench of the character described, an unloading mechanism comprising a rockable shaft located laterally of the bench and extending longitudinally thereof, unloading arms operatively associated with said shaft by means of rotatable pins fixed to said arms and carried by said shaft and extending transversely of the axis of the shaft, means for rocking said shaft to simultaneously raise said arms from a position wherein they extend substantially transversely and horizontally across the bench to an inclined or tilted position, and means for turning said pins about their axes upon the continued rocking movement of said shaft in the same direction to cause said arms to move from said inclined or tilted position to an edgewise but substantially horizontal position located laterally of a side of the bench, spring means associated with said last named means and placed under tension during said turning of said pins, and means for restraining said pins from turning in the reverse direction under the action of said spring, means for rocking said shaft in the reverse direction to move said arms from the edgewise position to a flat position extending substantially horizontally of the bench but laterally thereof, and means for successively releasing said restraining means as the carriage of the draw bench moves in a drawing direction to allow said spring means to turn said pins and move said arms in a horizontal plane to said first named position.

12. In a draw bench of the character described, an unloading mechanism comprising a rockable shaft located laterally of the bench and extending longitudinally thereof, bracket plates fixed to said shaft and having portions through which said shaft extends, rotatable pins extending through said bracket plates including said portions thereof and through said shaft and transversely of the axis of the latter, unloading arms fixed to the upper ends of said pins and overlying the upper surfaces of said bracket plates, fingers fixed to the lower ends of said pins, coil springs surrounding said portions of said bracket plates and having one of their ends engaging said fingers, fulcrum members secured to the side of said bench, means for rocking said shaft in one direction to simultaneously raise said bracket plates and said arms from a position wherein the bracket plates are horizontal and said arms extend substantially transversely and horizontally across the bench to an inclined or tilted position, said last named means continuing to rock said shaft in the same direction to cause said fingers to fulcrum about said fulcrum members to turn said pins, tension said springs, and swing said arms from the inclined or tilted position to an edgewise but substantially horizontal position located laterally of a side of the bench, cooperating means carried by said bracket plates and said arms for restraining said arms and pins against movement under the action of said springs, means for rocking said shaft in the reverse direction to move said bracket plates to their original horizontal position and to move said arms from their edgewise position into a substantially flat position located laterally of a side of the bench, and means carried by the carriage of the draw bench and successively engaging said restraining means as the carriage moves in the drawing direction to release said restraining means to allow said springs to move said arms in a horizontal plane back to the position wherein they extend substantially transversely and horizontally across the bench.

13. In a draw bench of the character described, an unloading mechanism comprising unloading arms formed of angularly disposed portions lying substantially in a common plane, and means for swinging said arms in a substantially vertical plane from a work-receiving position wherein one of said portions extends substantially transversely and horizontally across the bench to an inclined or tilted work-discharging position in which another of said portions forms an outwardly and downwardly extending work-guiding means.

14. In a draw bench of the character described, an unloading mechanism comprising unloading arms provided on their upper sides with angle brackets secured thereto, the upper edges of which are disposed at an angle to the upper side of said arms, and means for swinging said arms from a work-receiving position wherein they extend substantially transversely and horizontally across the bench to an inclined or tilted work-discharging position in which the upper edges of said brackets form outwardly and downwardly extending work-guiding means.

15. In combination with a draw bench of the character described, an unloading mechanism comprising unloading arms, means for swinging said arms from a position wherein they extend substantially transversely and horizontally across the bench to an inclined or tilted position, a structure for receiving the drawn rods and spaced laterally of the draw bench, and inclined transfer arms pivotally secured to the side of said structure and bridging the space between the structure and the draw bench and having their outer ends located to receive the rods rolling off said unloading arms when the latter are in the inclined or tilted position.

MAURICE A. NYE.
EDWIN J. McILVRIED.